May 1, 1928.
T. ZALUSKI
BORE HOLE APPARATUS
Filed April 3, 1926
1,668,034
2 Sheets-Sheet 2
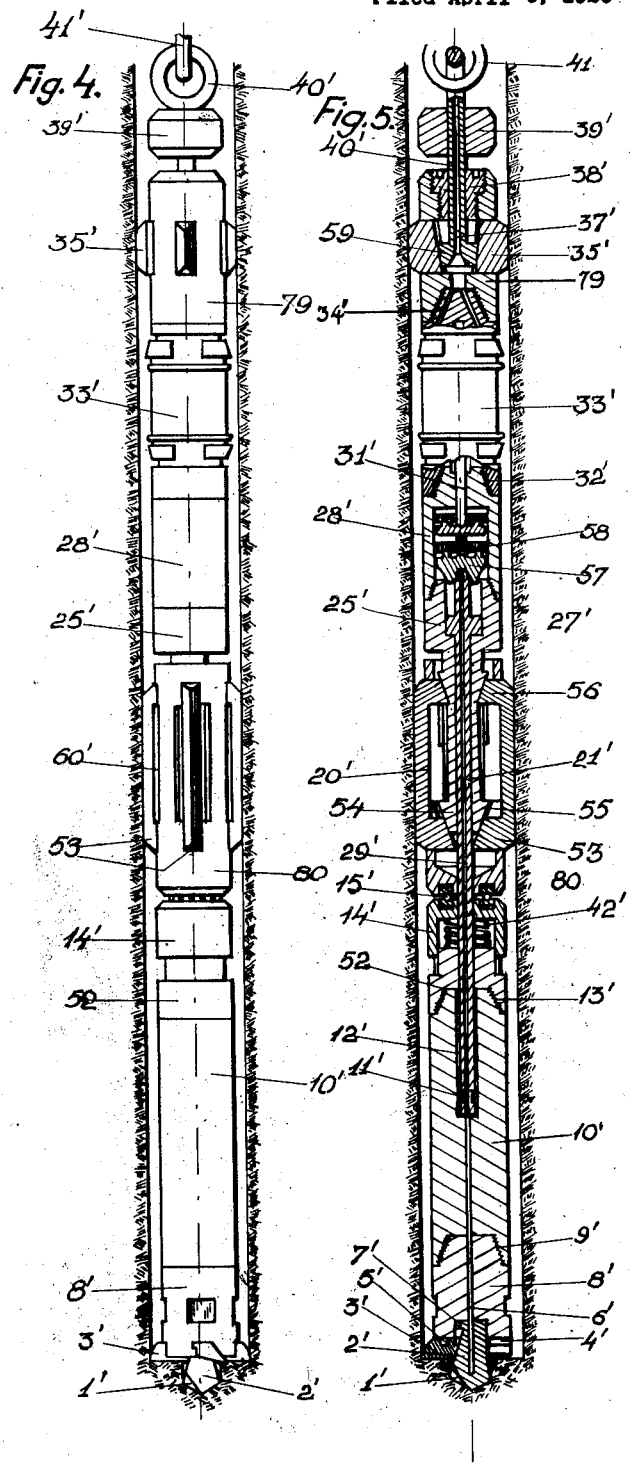

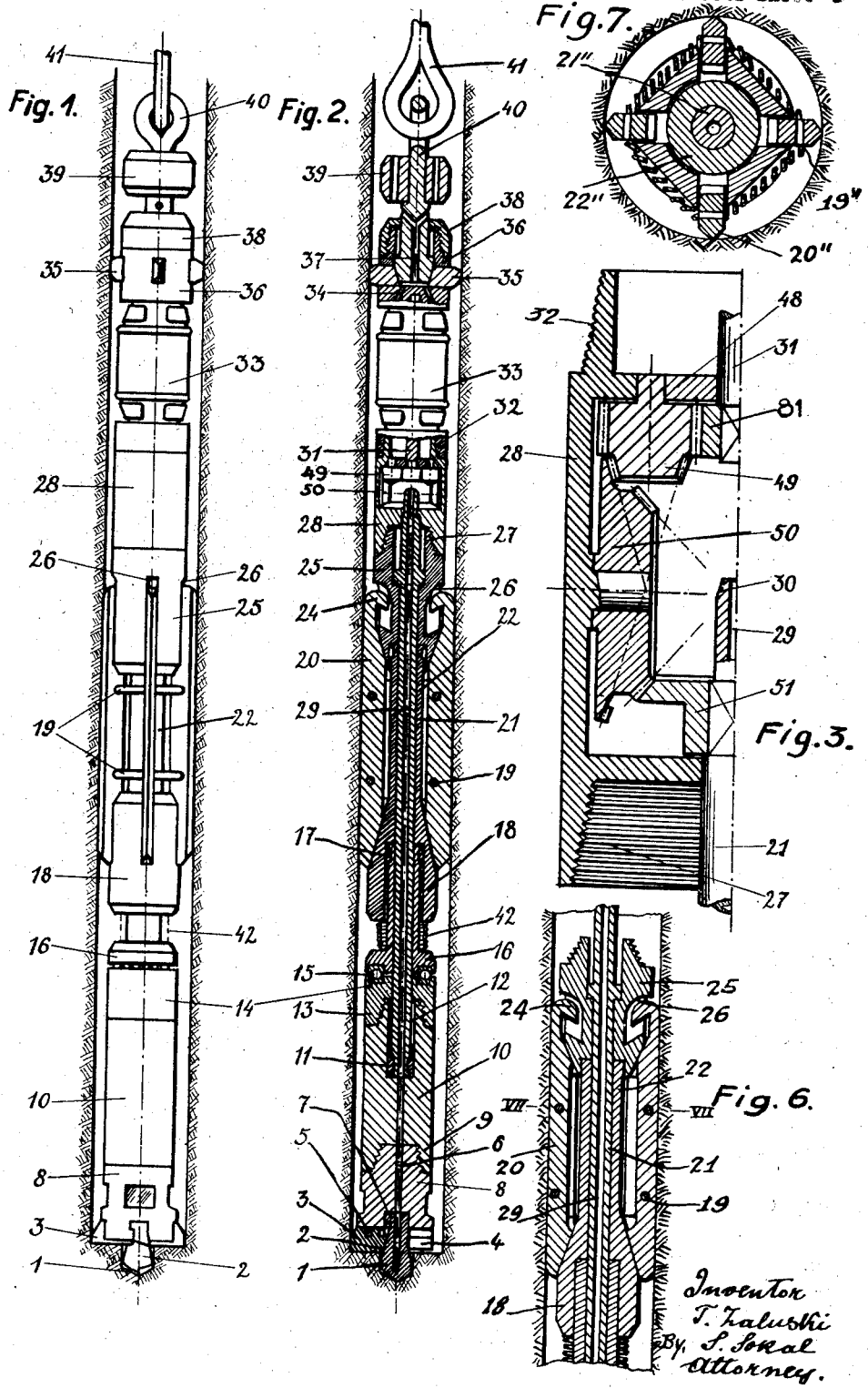

Patented May 1, 1928.

1,668,034

UNITED STATES PATENT OFFICE.

TADEUSZ ZALUSKI, OF LWOW, POLAND.

BORE-HOLE APPARATUS.

Application filed April 3, 1926, Serial No. 99,654, and in Germany February 28, 1925.

Bore-hole apparatus of the rotary type which are secured against turning in the bore-hole by means of clamping guides are known, but all these suffer from the drawback that they are only centered in the borehole at one place, namely, by means of the clamping guides themselves. In consequence, it may easily happen that devices of this kind do not bore exactly straight or perpendicular bore-holes, especially in the case of oblique strata intercepted by rock.

The subject of the present invention is a bore-hole apparatus which eliminates the above drawback inasmuch as it is centered at three places in the bore-hole, namely, by means of a separate slidable central drill bit, medial clamping guides displaceable away from one another, and upper clamping members likewise displaceable away from one another. In this way according to the invention, a secure immovable position of the bore-hole apparatus in boring is ensured, the said boring apparatus being centered below, in the middle, and above, so that a lateral displacement is impossible even with the most unfavourable strata.

The present invention is characterized by the feature that the centering at all three places is effected automatically by the action of the weight of the individual parts when the suspending cable is slackened and that when the suspending cable is rendered taut, the clamping devices in the bore-hole are likewise automatically put out of action.

The new bore-hole apparatus is illustrated by way of example in the accompanying drawings in which:

Fig. 1 shows the apparatus in the lowest position in the bore-hole in side elevation.

Fig. 2 is a longitudinal section through the bore-hole apparatus.

Fig. 3 is a longitudinal section to a larger scale through the gear box between the electro-motor and the driving shaft.

Figs. 4 and 5 show another constructional example of the invention in which the medial centering is effected in another way.

Fig. 6 is a longitudinal section through the clamping guides shown in Fig. 2, indicating more closely the mode of operation of these guides.

Fig. 7 is a cross section through Fig. 6 to a larger scale, on the line VII—VII.

The little drill bit 1, which serves for centering and acts as a pilot borer, is arranged slidably but not rotatably in the boring chuck 8. It is provided with wedge-shaped slots 2 in which the wedge-shaped end surfaces of the radially guided boring head members 3 engage. The boring head members 3 are guided in radial guides 4 of the boring chuck 8 and are held together by a spiral tension spring (not shown in the drawing) which engages in the recess 5 similarly to the spring 19″ in Fig. 7 in such a manner that the boring head members have the tendency to move inwards. If the centering drill bit 1, is in the position shown in the drawing, the boring head members 3 are separated to the greatest extent radially. On the other hand, if the drill bit 1 is in its initial position in which it is pushed downward with respect to the chuck 8, then the boring head members 3 are drawn together inwardly. The drill bit 1 is provided with a projection 7 at the end of the wedge-shaped slot by means of which it is held on to the boring head members and cannot fall out. The drill bit 1 is also provided with a tubular aperture 6 for the passage of the cleansing water.

The boring chuck 8 is attached by means of a conical screw 9 to the weight 10 which in turn is screwed tight in the lower part 14 of the ball bearing 15 by means of a conical screw 13, the upper part 16 of said bearing resting on the bearing and being under the action of the helical compression spring 42. The boring chuck 8 as well as the weight 10 are provided with internal tubular apertures which serve for the passage of the cleansing water during the boring. The end of the driving shaft 21 is arranged within the weight 10 and is provided at its lower end with keys 11 which are guided in axial grooves 12 of the weight 10. In this way, the driving shaft 21 is connected with the weight 10 in such a manner that the displacement of the two parts with respect to one another in an axial direction is possible, whereas rotation of the shaft 21 relative to the weight 10 is rendered impossible. The driving shaft 21 is likewise furnished with a central tubular aperture 29 which serves for the passage of the cleansing water.

The upper part 16 of the ball bearing 15 has an upwardly extending prolongation which is provided with grooves in which keys 17 engage, said keys being arranged in the lower part 18 of the clamping device. The result of this is that the part 18 is slidable with regard to the upper part of the ball bearing 15 but is not rotatable. The pressure spring 42 rests with its upper end on the lower surface of the part 18 in consequence of which the parts 16 and 18 tend to separate themselves from one another axially.

The lower part 18 of the clamping device is provided with a conical upper surface which engages with corresponding conical inner surfaces on the lower ends of the clamping guides 20. The clamping guides 20, four of which according to Figures 1 and 2, are provided at the periphery, are drawn towards one another by means of spring members 19. At the upper ends of the clamping guides 20 conical inner surfaces are likewise formed in which the conical lower part of the connecting piece 25 engages as soon as the part 25 is displaced downwardly with regard to the part 18 which is rendered possible, by the cylindrical guide at the upper end of the part 18. The conical end of the part 25 is provided with an upturned portion which allows the conical lower part to operate as a hook. This hook serves for engagement with the hook-shaped ends 24 of the clamping guides 20 when the part 25 is moved upwardly. In order to permit of a relative displacement of the hook-shaped ends 24 with regard to the part 25, the part 25 is provided with corresponding recess portions 26. The upper part of the driving shaft 21 is mounted in the part 25 in such a manner that the shaft 21 can move axially relative to 25.

The gear box 28 is firmly attached to the part 25 by means of a conical screw 27 and serves as a speed reducing gear for the transmission of the rotary motion of the electro-motor 33 to the driving shaft 21. The gear box 28 is shown on a larger scale in Figure 3. The shaft 31 of the electro-motor 33 passes through the upper wall 48 of the gear box 28 and is provided with a small pinion 81 which engages with two toothed wheels 49 which are constructed as cylindrical toothed wheels combined with conical toothed wheels. The conical teeth of the toothed wheels 49 engage with two bevel wheels 50 which in turn are in engagement with the bevel wheel 51, the hub of which is provided with a square hole which rests on the square end of the driving shaft 21. The shaft 21 is provided with a tubular aperture 29 reaching up to the top which serves for the passage of the cleansing water. The shaft 21 is provided at its uppermost end with a conical screw bolt 30 which serves for the screwing on of the driving tube in cases when the bore-hole apparatus is not driven by the electro-motor but from above with the aid of boring rods. The electro-motor 33 is firmly fixed to the gear box 28 by means of the conical screw portion 32.

For the purpose of suspending the electro-motor 33 from the suspending cable 41, a device is provided which consists of the part 36 rigidly attached to the electro-motor 33 said part 36 having the closure cap 38 screwed on to it by means of a conical screw. The part 36 is provided with radial openings in which clamping members 35 are arranged so as to be radially slidable, said clamping members having internal wedged surfaces. In the part 36 a rod 40 is slidably arranged which rod is provided at the top with an eyelet with which the eyelet-shaped end of the suspension cable 41 engages. The lower part of the rod 40 is provided with an extension which is slidable in the part 36 and has a conical surface underneath, which fits into the conical recesses of the clamping members 35. The rod 40 is loaded by the weight 39. The rod itself has a tubular aperture 37 through which the cable can pass which serves for the conduction of the current to the electro-motor 33 by means of the holes 34 in the electro-motor. If the suspending cable is lowered, then the rod 40 moves downwards and its conical end drives the clamping members 35 radially apart under the action of the loading weight 39.

The mode of operation of the new bore-hole apparatus is as follows:—

The whole device is lowered by means of the suspending cable 41 down to the bottom of the bore-hole. After the centering drill bit 1 has come into contact with the ground it penetrates in consequence of its being weighted by the weight 10 further and further into the ground. In consequence of its relative motion upwards with respect to 8 and 10, the drill bit drives the boring head members 3 upwards and the further boring operation is then effected not only by means of the pilot borer 1 but also by the boring head members 3. When the two borers 1 and 3 have arrived in their boring position the loading weight 10 is put out of action and the compression spring 42 is able to act upon the part 18 of the clamping apparatus and to press it upwards. The clamping guides 20 are then driven apart by the cones at 18 and at 26 and the whole bore-head apparatus is thus held firmly within the bore-hole. After the motor together with the gear case 28 have correspondingly moved downwards the lower conical end of the rod 40 forces the clamping members 35 outwards so that the upper end of the electro-motor is also firmly fixed with regard to the bore-hole. The boring operation now continues, the electro-motor 33 causing the driving shaft 21 to rotate by means of the toothed wheels 49, 50, 51 so that the said driving shaft rotates the loading weight 10 together with the drill bit 1 and the boring head members 3. The boring operation continues until the weight 10 has moved downwards relatively to the driving shaft to such an extent that the keys 11 of the driving shaft 21 are moved to the upper ends of grooves 12. When this has happened, the operation of the borer ceases since there is no longer any friction between the boring teeth and the ground. In consequence of this, the current consumption of the motor rapidly decreases which is indicated at the surface on the current measuring instruments. Notice is thus given that the bore-hole apparatus is no longer working.

In order to put the apparatus into action again, the suspending cable 41 is slightly pulled. As a result of this, the clamping members 35 are first drawn inwards and then the whole apparatus is raised. The clamping guides are drawn back and are moved radially inwards by the springs 19. During this operation the hook-shaped ends 24 of the clamping guides 20 are moved upwards by means of the hook-shaped lower part of the connecting piece 25. The lower part falls down again upon the pressure spring 42 and the weight 10 together with the chuck 8, the drill bit and the boring head members fall down once more so that the boring operations can commence again.

Upon lowering the suspending cable 41 once again, the clamping guides 20 are again pressed outwards, the clamping members 35 are again brought into contact with the bore-hole and the electromotor is in a position to actuate the boring device once again.

If the boring operations are to be carried out by driving from above, the gear case 28 is removed and a driving tube is screwed on to the screw 30 of the driving shaft 21. For the purpose of raising, the clamping device must be fixed beforehand with regard to the pipe by the aid of a nut in such a manner that the raising of the whole device is possible.

In the constructional form illustrated in Figures 4 and 5, the drill bit 1', the boring chuck 8', the boring head members 3', and the loading weight 10' are constructed similarly to those in the first constructional example. The cap 52 is attached to the loading weight 10' by means of a conical screw. On this cap 52 the cap 14' is mounted in such a way that it can move axially but cannot rotate. A spring 42' maintains the two caps axially separated from one another. On the upper cap 14' the ball bearing 15' is arranged, which ball bearing carries the lower part of the clamping mechanism. The latter consists of a hollow member formed in the shape of a tube which is provided with four slots serving for the reception of the clamping guides 20'. The upper part of the clamping mechanism consists of two cones which are connected with one another and are provided with a prolongation which forms at the same time the lower wall of the gear box. The clamping guides are arranged on the cones of the upper part of the clamping mechanism in such a manner that they move apart from one another when a downward movement of the clamping mechanism takes place whilst on the other hand they are positively moved inward by means of slots 55 when an upward movement of the clamping mechanism takes place. The driving shaft is provided with a union, which is constructed in the form of a stuffing box and acts as a seal for the upper portion of the clamping mechanism so that the penetration of water through the tubular aperture for the cleansing water of the weight 10' along the shaft into the gear box is prevented. In the gear box 28' the disc 57 is provided connected with the shaft by means of a conical screw, said disc serving to carry the planet gear which in this case consists entirely of spur wheels 58. 31' is the shaft of the electro-motor which is screwed on to the gear box by means of a cap 32'. On the electro-motor 33' the part 79 is mounted by means of a conical screw. The openings 34' as also the opening 37' in the rod 40', serve for the current connections for the electro-motor. The part 79 is provided with longitudinal slots in which the clamping members 35' are radially movable. The rod 40' is constructed at its lower part in a cone shape and is prevented from falling out by means of the nut 38'. 39' is the loading weight, 41', the suspending cable.

The mode of operation of the lower part of the apparatus is exactly the same as in the case of the first constructional example. The mode of operation of the middle part is as follows. After the lower drill bit has reached the ground and has caused the boring head members to be spread outwards and after the release of the suspending cable, the whole of the part of the apparatus lying above the spring 42', commences to move downwards. After the spring has become correspondingly stressed the part 25' begins to move axially downwards with regard to the part 53 so that the clamping guides 20', are spread outwards away from one another. On pulling the cable and after the upper clamping device has been released, the part 25' moves upwardly with regard to the part 80 so that the clamping guides 53 which are positively guided in the grooves are released. The mode of operation of the upper part of the apparatus is the same as in the previous constructional example.

The driving motor may also in the case of this constructional example, be replaced by rods or pipes by freeing the disc 57 and the part 28'.

I claim:—

1. A hole boring apparatus having a boring head, a shaft slidably keyed to the boring head, a shaft bearing, means for driving the shaft, radially movable clamping means for clamping the bearing in the bore hole, means actuated by the weight of a portion of the apparatus for spreading the clamping means, a second radially movable clamping means for steadying and centering the shaft above the first mentioned clamping means, and means actuated by the weight of another portion of the apparatus for spreading the second clamping means after the first clamping means has been expanded.

2. A hole boring apparatus having a boring head, a shaft slidably keyed to the head, means for driving the shaft, a bearing for the shaft above the boring head, radially movable clamping means for the shaft bearing, upper and lower conical expanders for the clamping means, said expanders being arranged to spread the upper and lower ends of the clamps when the weight of a portion of the apparatus is sustained by the clamping means through the medium of the expanders, a second expanding clamp above the first clamp, expanding means for the second clamp, and a weight movable relative to other portions of the apparatus for actuating the expanding means for the second clamp after the first clamping means has been set.

3. A hole boring apparatus having a boring head, a shaft slidably keyed to the head, a bearing for the shaft above the boring head, radially movable clamps associated with the bearing for clamping the bearing between the walls of a hole bored by the apparatus, clamp spreading means carried by the bearing and clamps arranged to spread the clamps by the weight of a portion of the apparatus, a motor carried by the bearing, driving connections between the motor and the shaft, a clamp frame carried by the motor, radially movable clamps carried by said frame, a weight movable in the clamp frame, and clamp spreading means on the clamps and weight.

4. A hole boring apparatus having a boring head, a shaft slidably keyed to the head, a bearing for the shaft above the boring head, a frame extending from said bearing, a second bearing for the shaft longitudinally movable in the frame of the first bearing, radially movable clamps mounted in the bearing frame having inwardly extending arms at their upper and lower ends, conical surfaces on the second bearing for expanding the clamps, a motor supported on the second bearing, and driving connections between the motor and shaft.

5. A hole boring apparatus having a boring head, a shaft slidably keyed to the head, a bearing for the shaft above the boring head, a frame extending from said bearing, a second bearing for the shaft longitudinally movable in the frame of the first bearing, radially movable clamps mounted in the bearing frame having inwardly extending arms at its upper and lower ends, conical surfaces on the second bearing for expanding the clamps, a motor supported on the second bearing, driving connections between the motor and shaft, and a spring interposed between the first bearing and the boring head for moving the head away from the bearing.

6. A hole boring apparatus having a boring head, a shaft slidably keyed to the head, a bearing for the shaft above the boring head, a frame extending from said bearing, a second bearing for the shaft longitudinally movable in the frame of the first bearing, radially movable clamps mounted in the bearing frame having inwardly extending arms at its upper and lower ends, conical surfaces on the second bearing for expanding the clamps, a motor supported on the second bearing, driving connections between the motor and shaft, a clamp frame supported on the motor, radially movable clamps in the clamp frame, a longitudinally movable weight in the frame, and clamp spreading means associated with the weight and clamps for spreading the clamps.

7. A hole boring apparatus having a boring head, a shaft slidably keyed to the boring head, a thrust bearing, one element of the thrust bearing being arranged to rotate with the boring head, an expansion spring interposed between said bearing element and the boring head, a frame extending from another element of the thrust bearing, radially movable clamps in said frame, a shaft bearing longitudinally movable in said frame, cooperating means on the clamps and said last mentioned bearing for spreading the clamps, an extension on said last mentioned bearing, a motor supported on said extension, driving connections between said motor and the shaft, a second clamp frame supported on the motor, radially movable clamps in the second frame, a weight movable mounted in the frame between the last mentioned clamps, cooperating means on the weight and clamps for spreading the clamps, means on the weight and second clamp frame for supporting the entire apparatus when the weight is lifted, and a lifting cable connected to the weight.

In testimony whereof I have hereunto set my hand.

TADEUSZ ZALUSKI.